United States Patent
Kono

(10) Patent No.: US 8,374,606 B2
(45) Date of Patent: Feb. 12, 2013

(54) WIRELESS COMMUNICATION TERMINAL AND HANDOFF DETERMINATION METHOD

(75) Inventor: Kenji Kono, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 2 days.

(21) Appl. No.: 10/542,225

(22) PCT Filed: Dec. 10, 2003

(86) PCT No.: PCT/JP03/15783
§ 371 (c)(1),
(2), (4) Date: Jul. 14, 2005

(87) PCT Pub. No.: WO2004/066521
PCT Pub. Date: Aug. 5, 2004

(65) Prior Publication Data
US 2006/0052104 A1 Mar. 9, 2006

(30) Foreign Application Priority Data
Jan. 20, 2003 (JP) .............................. P.2003-011539

(51) Int. Cl.
*H04W 36/00* (2009.01)
*H04W 4/00* (2009.01)
(52) U.S. Cl. ........ 455/436; 455/437; 455/439; 455/442; 370/331; 370/332
(58) Field of Classification Search .................. 455/439, 455/339, 436; 445/336, 339, 436; 370/331
See application file for complete search history.

(56) References Cited

U.S. PATENT DOCUMENTS

| 5,999,814 | A | * | 12/1999 | Cuffaro et al. | 455/436 |
| 6,320,855 | B1 | * | 11/2001 | Shi | 370/332 |
| 6,647,261 | B1 | * | 11/2003 | Banerjee | 455/436 |
| 6,782,261 | B1 | * | 8/2004 | Ahmed et al. | 455/436 |
| 7,006,473 | B2 | * | 2/2006 | Zhao | 370/332 |
| 7,016,320 | B1 | * | 3/2006 | Petersson et al. | 370/331 |
| 7,016,323 | B2 | * | 3/2006 | Yun et al. | 370/331 |
| 2003/0064724 | A1 | * | 4/2003 | Park | 455/436 |
| 2003/0203735 | A1 | * | 10/2003 | Andrus et al. | 455/450 |

FOREIGN PATENT DOCUMENTS

| JP | 05-73297 | | 10/1993 |
| JP | 07-030945 | * | 1/1995 |
| JP | 11-239375 | | 8/1999 |
| JP | 11239375 | * | 8/1999 |

(Continued)

OTHER PUBLICATIONS

Chinese language office action and its English language translation for corresponding Chinese application 200380109017.0 lists the references above.

*Primary Examiner* — Huy C Ho
(74) *Attorney, Agent, or Firm* — DLA Piper LLP (US)

(57) ABSTRACT

A wireless communication terminal includes a measurement section that measures quality of a signal transmitted from a base station, a determination section that determines whether or not handoff is to be performed based on a measurement result of the measurement section and a criterion of the determination of the handoff, and handoff section that performs the handoff based on a determination result of the determination section, wherein the determination section changes the criterion of the determination of the handoff when the handoff section performs the handoff in a predetermined repetition pattern.

12 Claims, 5 Drawing Sheets

FOREIGN PATENT DOCUMENTS

| | | | |
|---|---|---|---|
| JP | 11239375 A | | 8/1999 |
| JP | 2000-201369 | * | 7/2000 |
| JP | 1274252 A | | 11/2000 |
| JP | 2001-128204 | | 5/2001 |
| JP | 2001-128210 | * | 5/2001 |
| JP | 2003-018642 | | 1/2003 |

* cited by examiner

WIRELESS COMMUNICATION TERMINAL AND HANDOFF DETERMINATION METHOD

TECHNICAL FIELD

The invention relates to a wireless communication terminal, and more particularly, to a wireless communication terminal capable of reducing unnecessary idle handoff and to a handoff determination method thereof.

BACKGROUND ART

It is known that a wireless communication terminal communicating with a base station measures the quality of communication (Received Signal/Strength Indicator, Signal-to-Interference Ratio (SIR) value, error rate, or the like) with the base station by using an idle slot and performs handoff to another base station on the basis of the measurement result.

In order to perform the handoff, it is necessary to exchange several messages so that the wireless communication terminal can perform processing, such as registration of the terminal in a new base station, after the handoff.
Patent Document 1: JP-B-H5-73297

Particularly, in handoff (idle handoff) to be performed while the wireless communication terminal is an idle state condition, when the quality of communication with another base station has become superior to that of the base station with which the wireless communication terminal is currently in an idle state condition, the wireless communication terminal determines that the idle handoff is necessary and performs the idle handoff to the another base station which provides superior communication quality.

At this time, for instance, the communication qualities of the two base stations contend with each other, and when the relative rankings of the two communication qualities frequently reverse within a short period of time, the idle handoff arises frequently.

This state is shown in FIG. 4.

Even when the communication quality of the base station (A) is sufficiently superior to that of another base station (B), the communication quality of the base station (B) becomes superior to that of the base station (A) as a result of the communication quality of the base station (A) having been considerably deteriorated during measurement for reasons of instantaneous disconnection of a radio wave or the like. Consequently, the idle handoff arises. However, the communication quality of the base station (A) recovers immediately, whereupon the idle handoff again arises.

This state is shown in FIG. 5.

DISCLOSURE OF INVENTION

The invention has been conceived in view of the previously-described drawbacks and aims at providing a wireless communication terminal which lessens frequency of occurrence of idle handoff even when communication qualities of a plurality of base stations or sectors contend with each other and the relative rankings of communication qualities frequently reverse within a short period of time.

A first invention is characterized by having a measurement section that measures quality of a signal transmitted from a base station; a determination section that determines whether or not handoff is to be performed based on a measurement result of the measurement section and a criterion of the determination of the handoff; and a handoff section that performs the handoff based on a determination result of the determination section, wherein the determination section changes the criterion of the determination of the handoff when the handoff section performs the handoff in a predetermined repetition pattern.

A second invention according to the first invention is characterized in that the determination section changes the criterion of the determination of the handoff when a predetermined repetition of two pilot signals is acquired.

A third invention according to the second invention is characterized in that, when qualities of the two pilot signals acquired repeatedly are equal to or greater than a predetermined value, the criterion of the determination of the handoff is changed.

A fourth invention is characterized by further having a detection section that detects time during which a preceding pilot signal is acquired every time handoff is performed, wherein the determination section changes the criterion of the determination of the handoff based on the time detected by the detection section.

A fifth invention is characterized by having a measurement section that measures quality of a signal transmitted from a base station; a determination section that determines whether or not handoff is to be performed based on a measurement result of the measurement section and a criterion of the determination of the handoff; and a handoff section that performs the handoff based on a determination result of the determination section, wherein the determination section determines whether or not the handoff is to be performed based on a value obtained by time-averaging the measurement result of the measurement section immediately after the handoff is performed, and determines whether or not the handoff is to be performed based on a value obtained by number-averaging the measurement result of the measurement section after a lapse of a predetermined period since the handoff is performed.

A sixth invention according to any of the first through fifth inventions is characterized in that the wireless communication terminal enables to be in an idle state condition with both methods of cdma2000 1x method and 1xEVDO method, and the determination section is used as section for determining a handoff of cdma2000 1x method.

A seventh invention is characterized by a method of a wireless communication terminal which performs wireless communication using each of a first communication method and a second communication method and enables to be in an idle state condition with both methods, the handoff determination method involving the steps of: measuring quality of a signal transmitted from a base station; determining whether or not a handoff is to be performed based on a measurement result and a criterion of the determination of the handoff; performing the handoff based on a determination result; and changing the criterion of the determination of the handoff when the handoff section performed the handoff in a predetermined repetition pattern.

An eighth invention according to the seventh invention is characterized in that the criterion of the determination of the handoff is changed when two pilot signals are repeatedly acquired.

A ninth invention according to the eighth invention is characterized in that, when qualities of the two pilot signals acquired repeatedly are equal to or greater than a predetermined value, the criterion of the determination of the handoff is changed.

A tenth invention according to the seventh invention is characterized in that time during which a preceding pilot signal is acquired is detected every time handoff is performed, and the criterion of the determination of the handoff is changed based on the detected time.

An eleventh invention is characterized by involving the steps of: measuring quality of a signal transmitted from a base station; determining whether or not a handoff is to be performed based on a measurement result and a criterion of the determination of the handoff; and performing the handoff based on a determination result, wherein whether or not the handoff is to be performed is determined based on a value obtained by time-averaging the measurement result of the measurement section immediately after the handoff is performed, and whether or not the handoff is to be performed is determined based on a value obtained by number-averaging the measurement result the measurement section after a lapse of a predetermined period since the handoff is performed.

A twelfth invention is characterized in that the handoff determination method is used for a wireless communication terminal which enables to be in an idle state condition with both methods of cdma2000 1x method and 1xEVDO method, and whether or not handoff of a cdma2000 1x method is to be performed is determined.

BEST MODE FOR CARRYING OUT THE INVENTION

Embodiments of the invention will be described hereinbelow by reference to the drawings.

Figure 1:
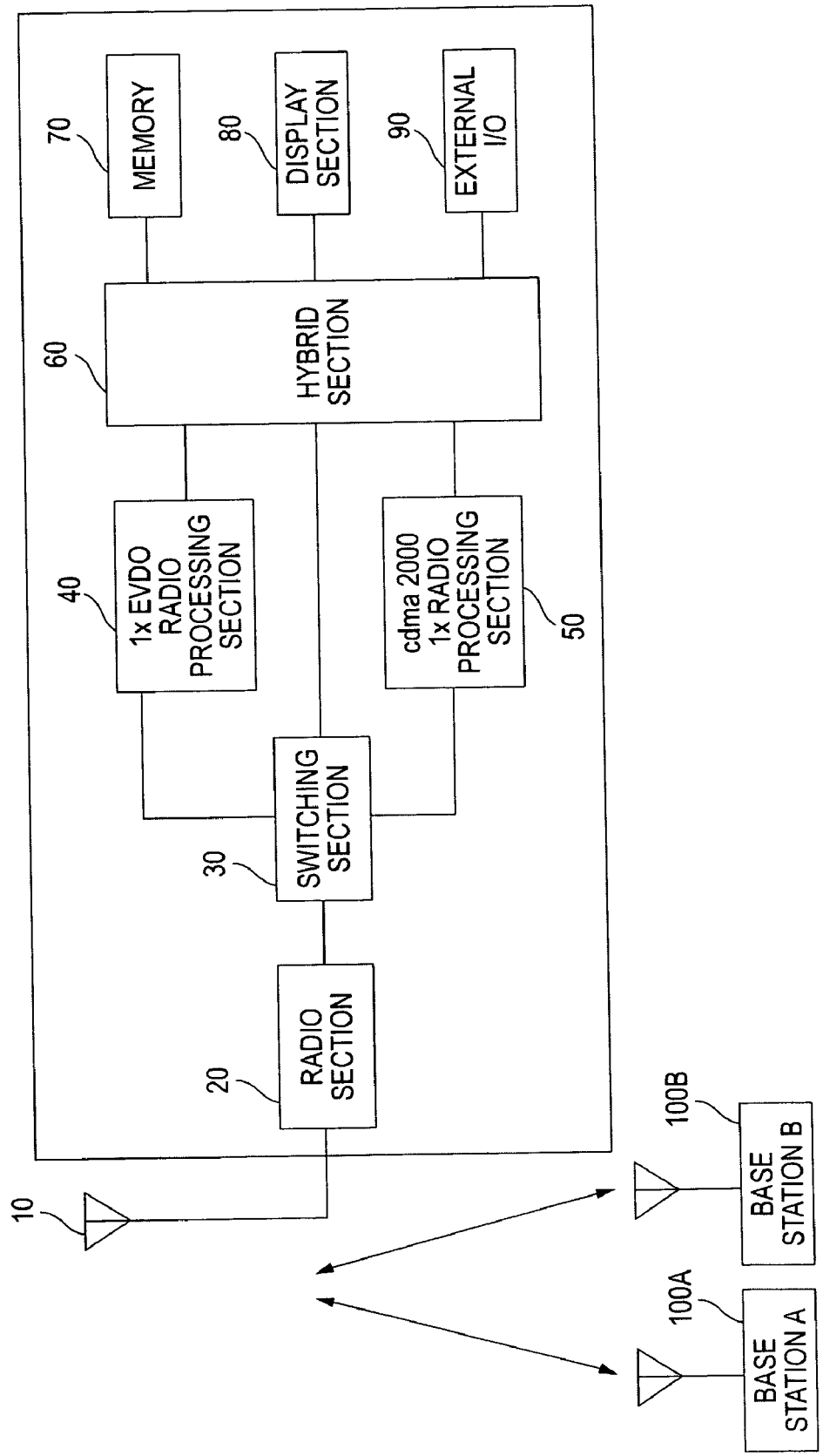
FIG. 1 is a block diagram showing the configuration of a wireless communication terminal according to a first embodiment of the invention.

FIG. 1 is a block diagram showing the configuration of a wireless communication terminal according to a first embodiment of the invention.

The wireless communication terminal of the embodiment is a wireless communication terminal which can perform communication while moving, by means of selectively switching between a communication system of cdma2000 1x method and a communication system of 1xEVDO (1x Evolution Data Only) method to perform handoff with a base station 101A and a base station 100B.

An antenna 10 transmits to the base stations (100A), (100B) high frequency signals received from a radio section 20, and receives radio waves output from the base stations (100A), (100B) to transmit the radio waves to the radio section 20 as high-frequency signals.

The radio section 20 converts the high-frequency signals transmitted from the antenna 10 into base band signals and sends the base band signals to radio processing sections 40, 50 through a switching section 30. Further, the radio section 20 converts base band signals transmitted from the radio processing sections 40, 50 through the switching section 30 into high-frequency signals to send the high-frequency signals to the antenna 10.

The switching section 30 selectively transmits the base band signals output from the 1xEVDO radio processing section 40 or the cdma2000 1x radio processing section 50 to the radio section 20. Further, the switching section 30 selectively sends the base band signals output from the radio section 20 to the 1xEVDO radio processing section 40 or the cdma2000 1x radio processing section 50.

The 1xEVDO radio processing section 40 converts data signals transmitted in 1xEVDO format into base band signals, and sends the base band signals to the radio section 20 through the switching section 30.

Moreover, the 1xEVDO radio processing section 40 converts base band signals transmitted from the radio section 20 through the switching section 30 into data signals in 1xEVDO format.

Like the 1xEVDO radio processing section 40, the cdma2000 1x radio processing section 50 converts data or audio signals transmitted in cdma2000 1x format into base band signals to send the base band signals to the radio section 20 through the switching section 30.

Moreover, the cdma2000 1x radio processing section 50 converts base band signals transmitted from the radio section 20 through the switching section 30 into data or audio signals in cdma2000 1x format.

A hybrid section 60 is a control section for controlling the two communication systems by means of selectively switching between the two communication systems; that is, 1xEVDO system and cdma2000 1x system. The hybrid section 60 is connected to the switching section 30, the 1xEVDO radio processing section 40, and the cdma2000 1x radio processing section 50, thereby controlling switching thereof.

Particularly, the two communication systems are selectively switched at predetermined time intervals during an idle state condition, and both communication systems await calls from the base stations (100A), (100B). The hybrid section 60 is connected to a memory 70, a display section 80, and an external I/O 90.

The memory 70 is a storage section which enables writing or reading of communication data, a program for controlling the wireless communication terminal, or the like.

The display section 80 is a display section which is mainly configured from an LCD display or the like and displays the status of the wireless communication terminal and communication data.

The external I/O 90 is an interface which connects the wireless communication terminal to an external equipment such as a personal computer or a PDA, thereby enabling to transmit and receive various data.

Operation of the wireless communication terminal of the first embodiment having the foregoing configuration will now be described.

Figure 4:
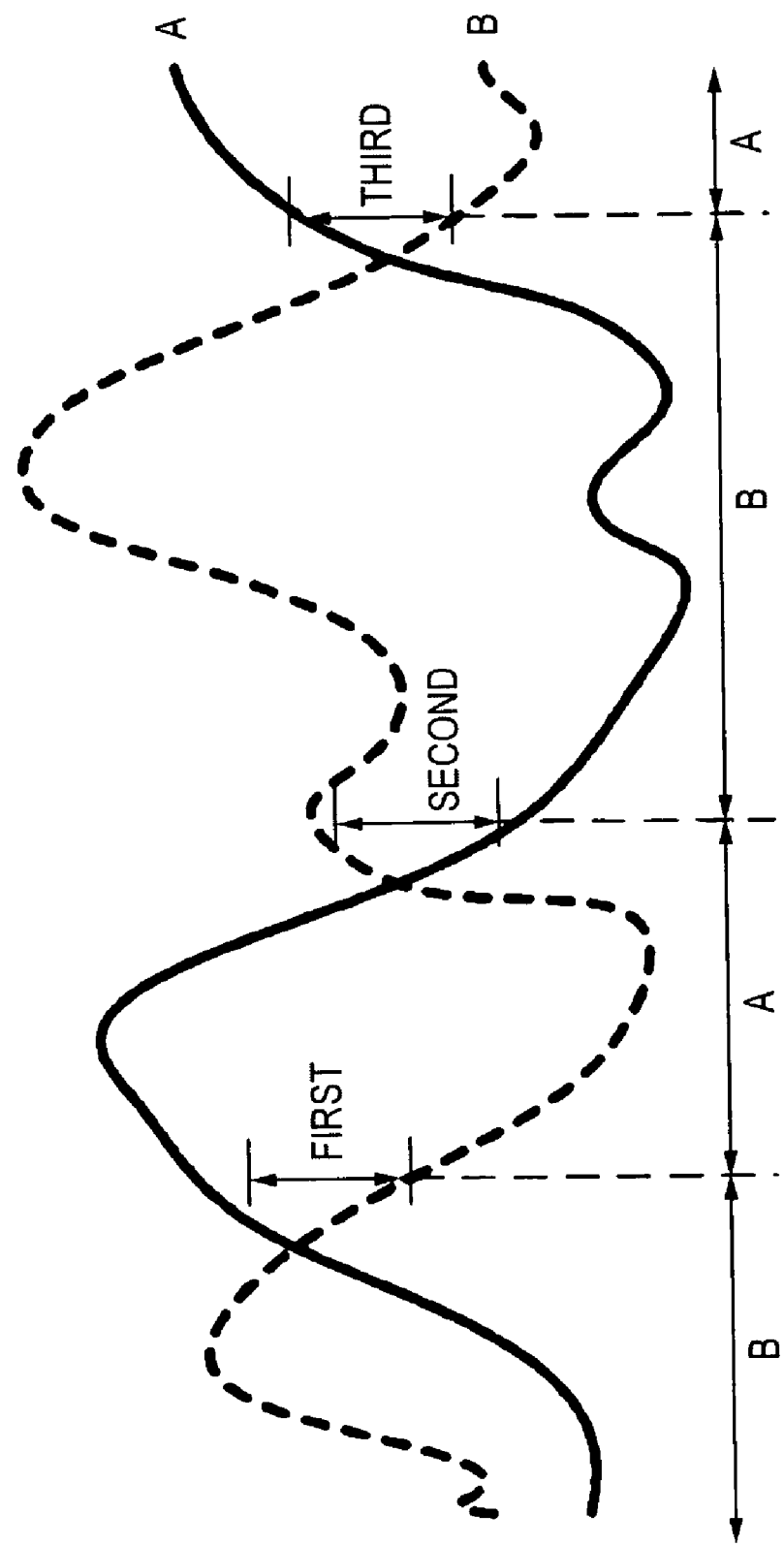
FIG. 4 is a timing chart showing a relationship between the quality of communication with base stations and idle handoff in a conventional communication terminal.

The wireless communication terminal of the first embodiment is configured such that the communication qualities (C/I values) of the two pilot signals A, B are sufficiently high to perform communication and such that the frequency of occurrence of the idle handoff (see FIG. 4) frequently arising with the two C/I values contending each other is reduced.

More specifically, the wireless communication terminal performs a processing for changing a threshold value used for determining whether or not the idle handoff is to be performed.

Figure 2:
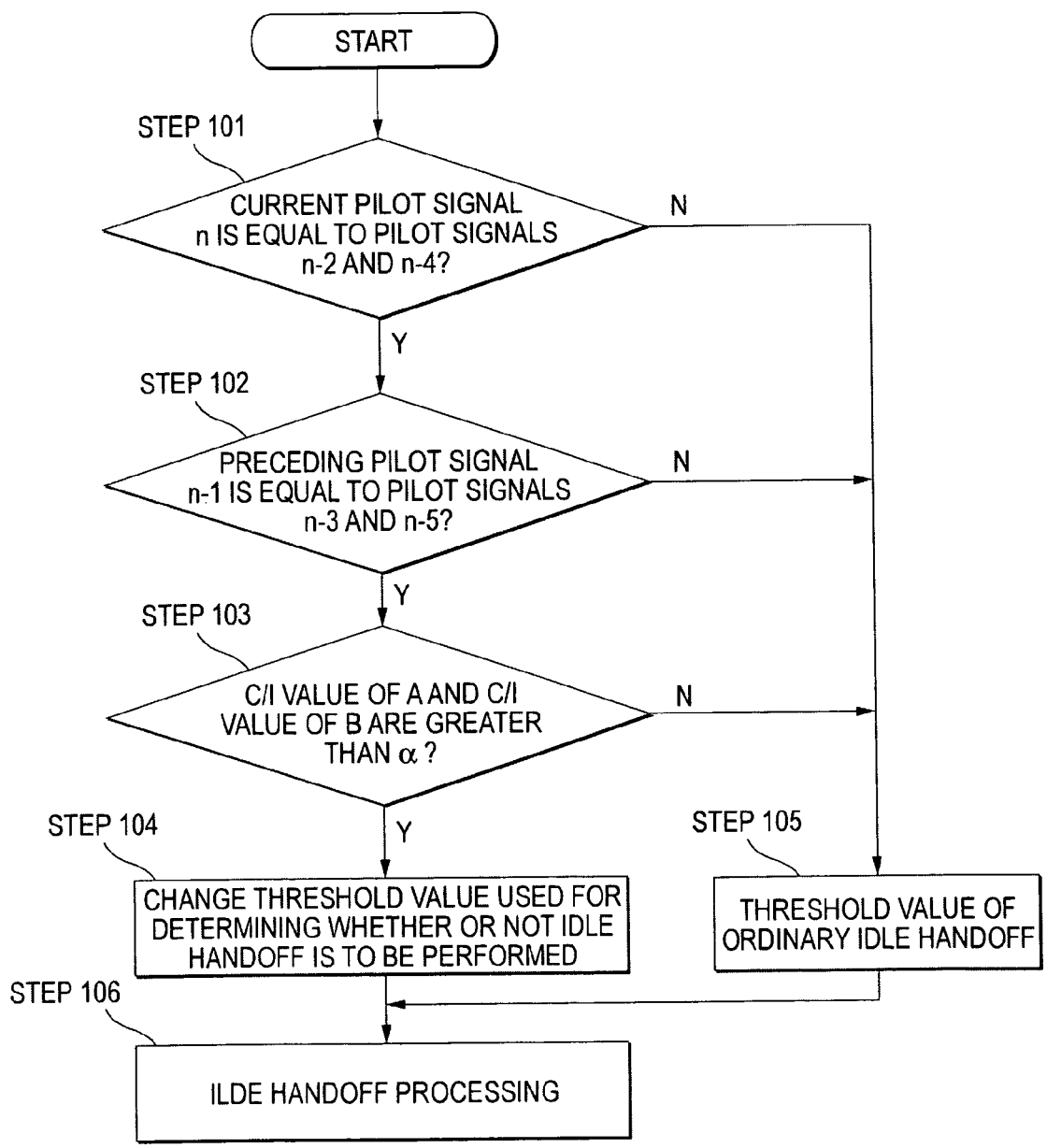
FIG. 2 is a flowchart showing idle handoff processing procedures of the first embodiment of the invention.

FIG. 2 shows a procedure for setting the threshold value of the idle handoff for reducing the frequency of occurrence of the idle handoff.

First, a currently-monitored pilot signal is taken as n, a pilot signal preceding occurrence of last idle handoff is taken as n−1, a pilot signal preceding occurrence of second last idle handoff is taken as n−2, . . . .

It is determined whether or not the currently-monitored pilot signal n, the pilot signal n−2 before the second last idle handoff, and a pilot signal n−4 before the fourth last idle handoff are all equal to each other (step 101).

If the currently pilot signal n, the pilot signal n−2 before the second last idle handoff, and the pilot signal n−4 before the fourth last idle handoff are all equal to each other, it proceeds to step 102.

If any of the currently-monitored pilot signal n, the pilot signal n−2 before the second last idle handoff, and the pilot signal n−4 before the fourth last idle handoff differs from the others, it proceeds to step 105, where a threshold value for ordinary idle handoff is set, and the procedure completes.

In step 102, it is determined whether or not the pilot signal n−1 before the last idle handoff, a pilot signal n−3 before third last idle handoff, and a pilot signal n−5 before fifth last idle handoff are equal to each other.

If the pilot signal n−1 before the last idle handoff, the pilot signal n−3 before the third last idle handoff, and the pilot signal n−5 before the fifth last idle handoff are all equal to each other, it proceeds to step 103.

If any of the pilot signal n−1 before the last idle handoff, the pilot signal n−3 before the third last idle handoff, and the pilot signal n−5 before the fifth last idle handoff differs from the others, it proceeds to step 105, where the threshold value for the ordinary idle handoff is set, and the procedure completes.

That is, through the processing shown in FIG. 2 for setting a threshold value, it is determined that the handoff have repeatedly arisen in a single pilot signal in each step 101, 102.

Next, in step 103, it is determined whether or not a C/I value (A) of the current pilot signal and a C/I value (B) of the pilot signal before the last idle handoff are greater than a preset value $\alpha$.

If the C/I values of the two pilot signals are greater than $\alpha$, it proceeds to step 104.

If the C/I values of the two pilot signals are sufficiently large, the qualities of the pilot signals are superior. Thus, communication with only one of the pilot signals is sufficient so that it is unnecessary to perform the idle handoff.

If the C/I values of the two pilot signals are smaller than $\alpha$, the throughput of communication is improved by communicating with the pilot signal having the larger C/I value. Therefore, the threshold value of the ordinary idle handoff is set (step 105).

The value of $\alpha$ is previously determined through a test or the like such that the best communication throughput is attained in terms of a relationship between the frequency of occurrence of the idle handoff and the C/I value.

There will now be described changing, in step 104, the threshold value for determining whether or not idle handoff is to be performed.

When the two pilot signals are alternately switched at least twice through the idle handoff by means of the processing pertaining to steps 101 to 103 and when the C/I values of the radio waves of the two pilot signals are sufficiently greater than $\alpha$, the threshold value of the idle handoff is changed to a value at which the idle handoff does not arise frequently (step 104).

For instance, the threshold value used for determining whether or not the ordinary idle handoff is to be performed is assumed to be $\gamma$, a value $\gamma'$ obtained by addition of a predetermined value X to $\gamma$ is used for determining whether or not the idle handoff is to be performed.

In steps 101 and 102 described above, it is determined whether or not switching between the pilot signal A and the pilot signal B has been made twice. However, the determination may be made as to whether or not the switching is repeated once.

In the wireless communication terminal of the first embodiment having the foregoing configuration, when the C/I values of the two pilot signals are greater than a predetermined value and when occurrence of the idle handoff to be repeatedly effected a predetermined number of times has been detected, the threshold value for determining the idle handoff is changed such that the number of times the idle handoff arises is reduced, in order to reduce the frequency of occurrence of the idle handoff frequently arising when the C/I values of the two pilot signals contend with each other.

As a result, the burden imposed on the base station and that imposed on the wireless communication terminal can be diminished, whereby consumption of a battery of the wireless communication terminal can be suppressed.

As in the case of the present embodiment, the wireless communication terminal of hybrid type can diminish the time during which one communication system occupies the radio section 20 by repeated idle handoff processing. Thus, a communication throughput of another communication system can be enhanced.

A wireless communication terminal according to a second embodiment of the invention will now be described.

Figure 5:
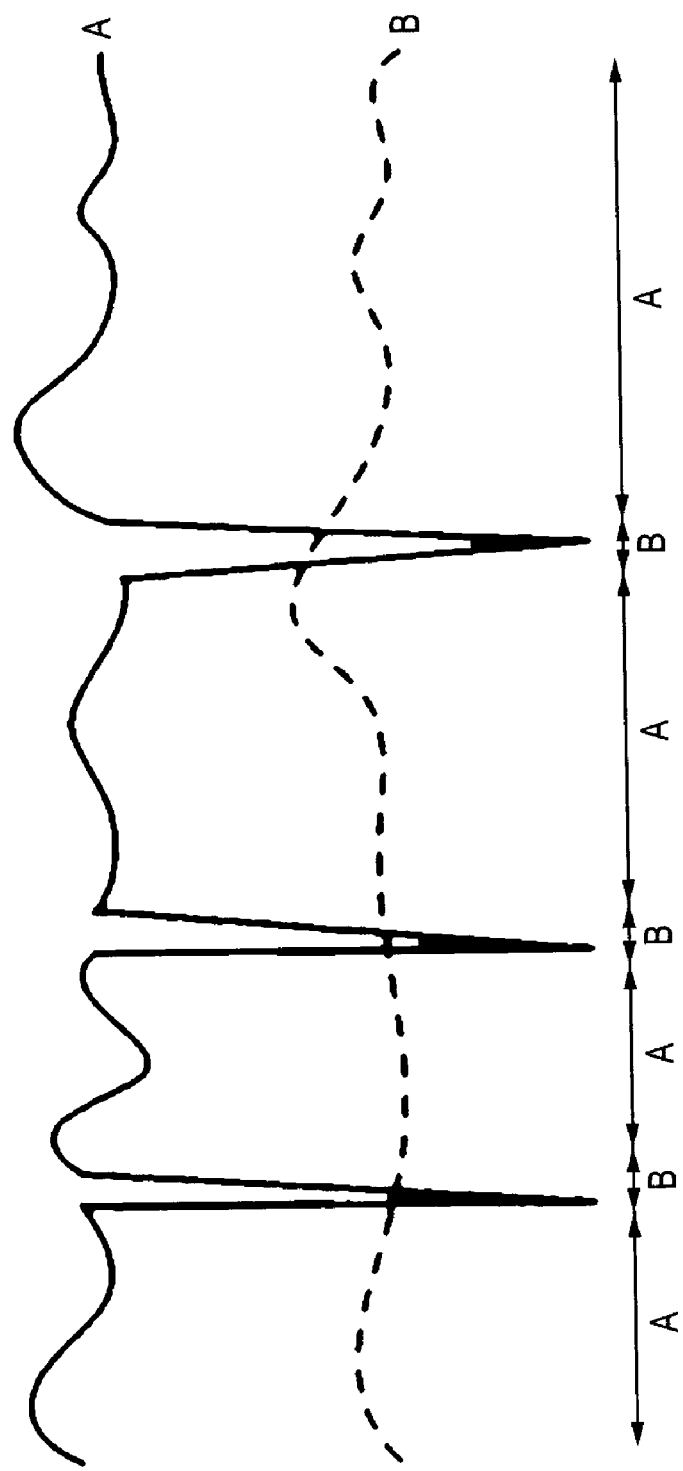
FIG. 5 is a similar timing chart showing a relationship between the quality of communication with base stations and idle handoff in the conventional communication terminal.

As shown in FIG. 5, in the conventional wireless communication terminal, when "instantaneous interruption" in which the pilot signal A is instantaneously interrupted under the situation where the C/I value of the pilot signal A is sufficiently large and where the C/I value of the other pilot signal B is smaller than that of the pilot signal A, the C/I value of the pilot signal A becomes considerably small during the period of the instantaneous interruption of the radio wave.

Consequently, since the C/I value of the pilot signal B becomes greater than that of the pilot signal A, the wireless communication terminal which has measured the communication quality at this time determines to require the idle handoff, and the idle handoff is performed.

However, when the instantaneous interruption is temporary and the communication quality of the pilot signal A has recovered immediately, the C/I value of the pilot signal A becomes greater than that of the pilot signal B, and the idle handoff arises again.

Thus, the idle handoff arises twice within a short period of time. Accordingly, the idle handoff frequently arises under a situation where the instantaneous interruption of the pilot signal A arises frequently.

In the wireless communication terminal of the second embodiment of the invention, a method of determining whether or not the idle handoff is to be performed is changed so as to reduce the frequency of occurrence of the idle handoff which arises a plurality of times within a short period of time as a result of the instantaneous interruption of radio wave.

Figure 3:
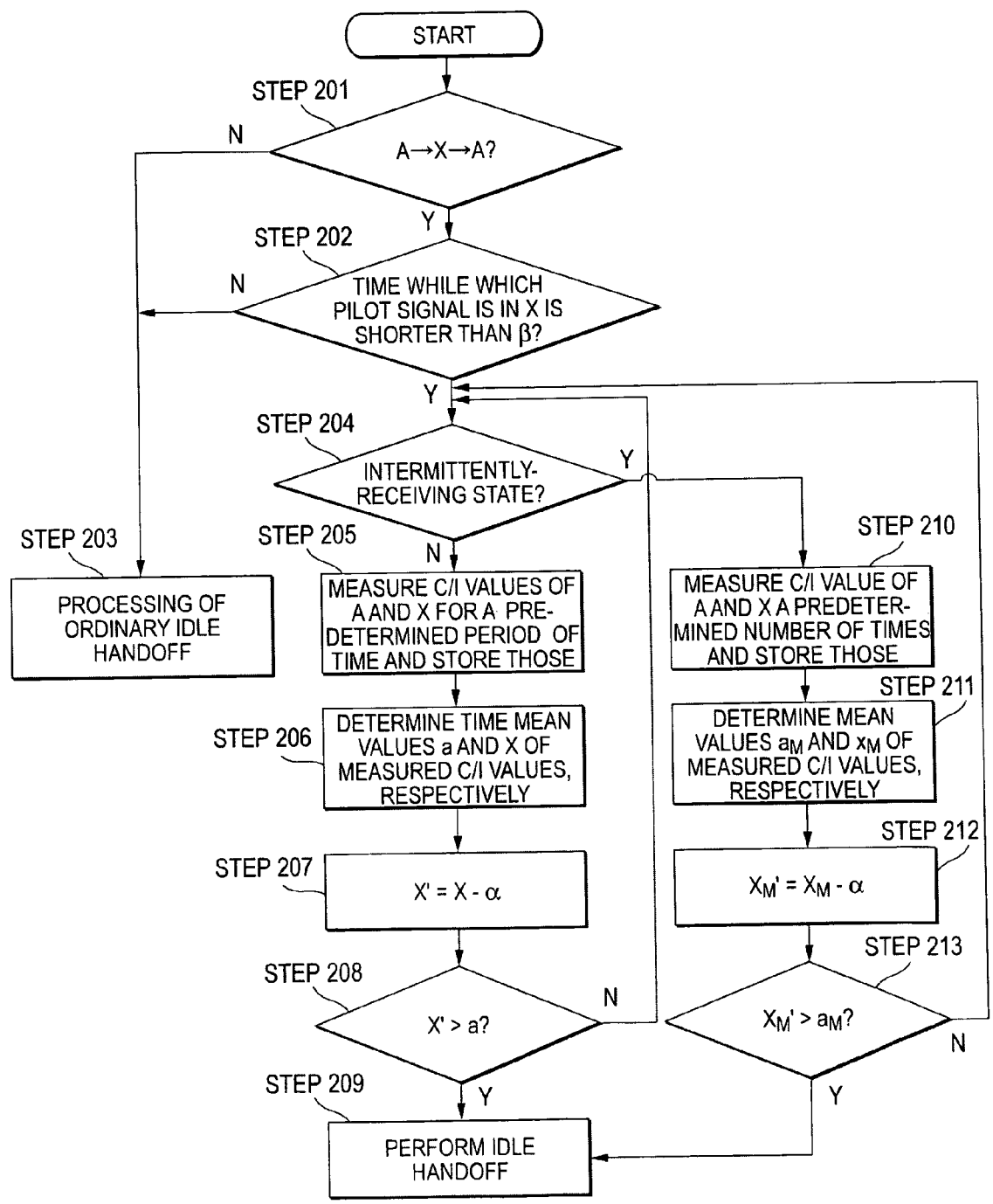
FIG. 3 is a flowchart showing idle handoff processing procedures of a second embodiment of the invention.

FIG. 3 shows a procedure for setting the idle handoff of the second embodiment.

In step 201, it is determined how the idle handoff has arisen.

Specifically, it is determined whether the idle handoff has arisen twice, and the pilot signal is switched from the pilot signal A to another pilot signal (X) at this time, and is then returned from the other pilot signal (X) to the pilot signal A.

If it is determined that the pilot signal is switched so as to return to the same pilot signal (A-X-A), it proceeds to step 202.

If not, it proceeds to step 203, where a threshold value of ordinary idle handoff is set.

In step 202, the time during which the pilot signal has switched to the monitored pilot signal X until returning to the same pilot signal is compared with a predetermined value $\beta$.

If the comparison result shows that the time during which the pilot signal X is monitored is shorter than β, it proceeds to step 204. If the time is longer than β, it proceeds to step 203, where the threshold value of the ordinary idle hand off is set.

In step 204, it is determined whether or not the current state is an intermittently-receiving state.

If the current state is the intermittently-receiving state, it proceeds to step 210. If the current state is not the intermittently-receiving state, it proceeds to step 205.

In step 205, the communication quality (C/I value) of the current pilot signal A and the communication quality (C/I value) of the previous pilot signal X are measured for a predetermined period of time, and measurement results are stored.

Next, a time mean value of the C/I values of the pilot signal A and that of the C/I values of the pilot signal X, both signals being measured in step 206, are determined as a and x (step 206).

A value x' is then obtained by subtracting a predetermined value α from the mean value x of the C/I values of the previous pilot signal X (step 207). The α is a threshold value for determining whether or not the idle handoff is to be performed. For instance, when a difference between a C/I value of a currently-monitored pilot signal C and a C/I value of another pilot signal D has become larger than the threshold value α, idle handoff from the pilot signal C to the pilot signal D is performed.

Next, x' is compared with a. If x' is greater than a, it proceeds to step 209, where the idle handoff is performed.

On the other hand, If x' is smaller than a, it returns to step 204 (step 208).

In the processing of step 208, only when the value x' determined as a result of subtraction of the predetermined threshold value α from the mean value x of the C/I value of the previous pilot signal X is greater than the mean value a of the C/I value of the current pilot signal A (when x is larger than a by α or more), it is determined the idle handoff is required, and the idle handoff is performed.

Specifically, a determination as to whether or not the idle handoff is to be performed is made not on the basis of the C/I value achieved at that time, but on the basis of a mean value of the C/I value acquired within a predetermined period of time. When the time mean value has become greater than the threshold value α, processing of the idle handoff is performed.

In step 209, the processing of the idle handoff is performed.

When it is determined that the current state is the intermittently-receiving state in step 204, the communication quality (C/I value) of the current pilot signal A and the communication quality (C/I value) of the previous pilot signal X are measured a predetermined number of times, and measurement results are stored in step 210.

Next, a mean value of the C/I values of the pilot signal A and that of the C/I values of the pilot signal X, both signals being measured in step 210, are determined as $a_M$ and $x_M$ (step 211).

A value $x_M'$ is then obtained by subtracting a predetermined value α from the mean value $x_M$ of the C/I values of the previous pilot signal X (step 212).

Next, $x_M'$ is compared with $a_M$. When $x_M'$ is greater than $a_M$, it proceeds to step 209, where the idle handoff is performed. When $x_M'$ is smaller than $a_M$, it returns to step 204 (step 213).

Specifically, a determination as to whether or not the idle handoff is to be performed is made not on the basis of the C/I value determined from a single measurement result, but on the basis of a means value of the C/I values determined through a predetermined number of measurement.

In the invention, in the case where disconnection and return idle handoff have arisen, the processing is performed so as to perform the idle handoff only when the time of the previously-monitored pilot signal is shorter than a predetermined time and when the time mean value of the C/I values of the currently-monitored pilot signal is greater than the time mean value of the C/I values of the previous pilot signal by only a predetermined threshold value.

In the intermittently-receiving state, the C/I value of the currently-monitored pilot signal and the C/I value of the pilot signal previously-monitored are compared with the mean value of the C/I values obtained through a predetermined number of measurement. Only when the C/I value of the previously-monitored pilot signal is greater than the C/I value of the currently-monitored pilot signal by a predetermined threshold value or more, the idle handoff is performed. Therefore, the idle handoff can be prevented from arising frequently even under the situation where the communication quality of one pilot signal is better than the communication quality of another pilot signal and where the instantaneous interruption occurs to the one pilot signal.

Consequently, as in the case of the first embodiment, the burden imposed on the base station and that imposed on the wireless communication terminal can be diminished, whereby consumption of a battery of the wireless communication terminal can be suppressed.

Moreover, as in the case of the present embodiment, the wireless communication terminal of hybrid type can diminish the time during which one communication system occupies the radio section 20 by repeated idle handoff processing. Thus, the communication throughput of another communication system can be enhanced.

The wireless communication terminals of the first and second embodiments employ a C/I value for determining whether or not the idle handoff is to be performed. RSSI (Received Signal/Strength Indicator) may be employed.

The wireless communication terminals of the first and second embodiments are explained as hybrid type wireless communication terminals which is in an idle state condition with both systems, that is, the cdma2000 1x system and the 1xEVDO system. It may also be applied to a wireless communication terminal using another communication system.

The threshold value α is not limited to subtraction but may be subjected to same function. Thus, the threshold value α is not limited to the embodiments.

The invention has been described in detail by reference to specific embodiments. However, as is obvious to a person skilled in the art, the invention can be subjected to various modifications or corrections without departing from the sprint and scope thereof.

The present patent application is based on Japanese Patent Application (Patent Application No. 2003-11539) filed on Jan. 20, 2003, and descriptions of the application are incorporated herein by reference.

INDUSTRIAL APPLICABILITY

According to the invention, the frequency of occurrence of idle handoff which frequently arises within a short period of time can be reduced. As a result, the burden imposed on the base station and that imposed on the wireless communication terminal can be diminished, and consumption of a battery of the wireless communication terminal can also be reduced. Moreover, a communication throughput of a communication system can be improved.

The invention claimed is:
1. A wireless communication terminal comprising:
   a measurement section that measures quality of a signal transmitted from a base station;
   a determination section that determines whether or not handoff is to be performed based on a measurement result of the measurement section and a threshold value of the determination of the handoff; and a handoff section that performs the handoff based on a determination result of the determination section, wherein the determination section determines whether the handoff section has performed a predetermined repetition pattern of handoffs, and changes the threshold value of the determination of the handoff if it is determined that the handoff section has performed the predetermined repetition pattern of handoffs, wherein the determination section changes the threshold value of the determination of the handoff when a predetermined repetition of two pilot signals is acquired, wherein when qualities of the two pilot signals acquired repeatedly are equal to or greater than a predetermined value, the threshold value of the determination of the handoff is changed.

2. The wireless communication terminal according to claim 1, further comprising:

a detection section that detects time during which a preceding pilot signal is acquired every time handoff is performed, wherein the determination section changes the threshold value of the determination of the handoff based on the time detected by the detection section.

3. The wireless communication terminal according to claim 1 or 2, wherein the wireless communication terminal enables to be in an idle state condition with both methods of cdma2000 1x method and 1xEVDO method, and the determination section is used as section for determining a handoff of cdma2000 1x method.

4. The wireless communication terminal according to claim 1, wherein the predetermined repetition pattern of handoffs is a return handoff.

5. The wireless communication terminal according to claim 1, wherein the determination section changes the threshold value of the determination of the handoff if it is determined that the handoff section has performed the predetermined repetition pattern of handoffs, and a strength or a quality of a current signal is above a predetermined threshold.

6. A handoff determination method of a wireless communication terminal which performs wireless communication using each of a first communication method and a second communication method and enables to be in an idle state condition with both methods, the handoff determination method comprising the steps of:

measuring quality of a signal transmitted from a base station;

determining whether or not a handoff is to be performed based on a measurement result and a threshold value of the determination of the handoff;

performing the handoff based on a determination result;

determining whether the handoff section has performed a predetermined repetition pattern of handoffs; and changing the threshold value of the determination of the handoff if it is determined that the handoff section has performed the predetermined repetition pattern of handoffs, wherein the threshold value of the determination of the handoff is changed when two pilot signals are repeatedly acquired, wherein when qualities of the two pilot signals acquired repeatedly are equal to or greater than a predetermined value, the threshold value of the determination of the handoff is changed.

7. The handoff determination method according to claim 6, wherein time during which a preceding pilot signal is acquired is detected every time handoff is performed, and the threshold value of the determination of the handoff is changed based on the detected time.

8. The handoff determination method according to claim 6 or 7, wherein the handoff determination method is used for a wireless communication terminal which enables to be in an idle state condition with both methods of cdma2000 1x method and 1xEVDO method, and whether or not handoff of the cdma2000 1x method is to be performed is determined.

9. The handoff determination method according to claim 6, wherein the predetermined repetition pattern of handoffs is a return handoff.

10. The handoff determination method to claim 6, further comprising:

changing the threshold value of the determination of the handoff if it is determined that the handoff section has performed the predetermined repetition pattern of handoffs and a strength or a quality of a current signal is above a predetermined threshold.

11. A wireless communication terminal comprising:

a measurement section that measures quality of a signal transmitted from a base station;

a determination section that determines whether or not handoff is to be performed based on a measurement result of the measurement section and a threshold value of the determination of the handoff;

a handoff section that performs the handoff based on a determination result of the determination section;

a detection section that detects a time period during which a pilot signal is acquired; and a change section that, when a handoff is performed so that a currently acquired pilot signal is switched to return to a same pilot signal that is same as a preceding pilot signal, changes the threshold value of the determination of the handoff based on time period during which the currently acquired pilot signal is acquired until returning to the same pilot, wherein the determination section changes the threshold value of the determination of the handoff when a predetermined repetition of two pilot signals is acquired, wherein when qualities of the two pilot signals acquired repeatedly are equal to or greater than a predetermined value, the threshold value of the determination of the handoff is changed.

12. A handoff determination method comprising:

measuring quality of a signal transmitted from a base station;

determining whether or not a handoff is to be performed based on a measurement result and a threshold value of the determination of the handoff;

performing the handoff based on a determination result;

detecting a time period during which a pilot signal is acquired;

when a handoff is performed so that a currently acquired pilot signal is switched to return to a same pilot signal that is same as a preceding pilot signal, changing the threshold value of the determination of the handoff based on time period during which the currently acquired pilot signal is acquired until returning to the same pilot signal, wherein the threshold value of the determination of the handoff is changed when two pilot signals are repeatedly acquired, wherein when qualities of the two pilot signals acquired repeatedly are equal to or greater than a predetermined value, the threshold value of the determination of the handoff is changed.

* * * * *